United States Patent
Prest et al.

(10) Patent No.: US 8,961,091 B2
(45) Date of Patent: Feb. 24, 2015

(54) FASTENER MADE OF BULK AMORPHOUS ALLOY

(75) Inventors: Christopher D. Prest, San Francisco, CA (US); Matthew S. Scott, Campbell, CA (US); Stephen P. Zadesky, Portola Valley, CA (US); Richard W. Heley, Palo Alto, CA (US); Dermot J. Stratton, San Francisco, CA (US); Joseph C. Poole, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 316 days.

(21) Appl. No.: 13/525,553

(22) Filed: Jun. 18, 2012

(65) Prior Publication Data

US 2013/0333165 A1    Dec. 19, 2013

(51) Int. Cl.
*F16B 35/04*    (2006.01)

(52) U.S. Cl.
USPC .......................................................... 411/424

(58) Field of Classification Search
USPC ...................... 411/378, 411, 424, 900; 24/381
See application file for complete search history.

(56) References Cited

U.S. PATENT DOCUMENTS

| | | | |
|---|---|---|---|
| 5,288,344 A | 2/1994 | Peker | |
| 5,368,659 A | 11/1994 | Peker | |
| 5,482,580 A | 1/1996 | Scruggs | |
| 5,618,359 A | 4/1997 | Lin | |
| 5,711,363 A * | 1/1998 | Scruggs et al. | 164/113 |
| 5,735,975 A | 4/1998 | Lin | |
| 6,325,868 B1 | 12/2001 | Kim | |
| 6,818,078 B2 | 11/2004 | Kim | |
| 7,575,040 B2 | 8/2009 | Johnson | |
| 7,883,307 B2 * | 2/2011 | Pippard et al. | 411/387.1 |
| 2004/0052606 A1 * | 3/2004 | Kerl | 411/80.1 |
| 2007/0079907 A1 | 4/2007 | Johnson | |
| 2008/0118387 A1 | 5/2008 | Demetriou | |
| 2010/0084052 A1 | 4/2010 | Farmer | |
| 2013/0336745 A1 * | 12/2013 | Trinick et al. | 411/501 |
| 2014/0007987 A1 * | 1/2014 | Prest et al. | 148/526 |
| 2014/0086705 A1 * | 3/2014 | Dawson et al. | 411/393 |
| 2014/0186138 A1 * | 7/2014 | Dawson et al. | 411/393 |

FOREIGN PATENT DOCUMENTS

JP    2001-303218    10/2001

OTHER PUBLICATIONS

Inoue et al., "Bulk amorphous alloys with high mechanical strength and good soft magnetic properties in Fe—Tm—B (Tm=IV–VIII group transition metal) system", Appl. Phys. Lett., vol. 71, p. 464 (1997).

Shen et. al., "Bulk Glassy CO43FE20TA5.5B31.5 Alloy with High Glass-Forming Ability and Good Soft Magnetic Properties", Materials Transactions, vol. 42 No. 10 (2001) pp. 2136-2139.

* cited by examiner

*Primary Examiner* — Roberta Delisle
(74) *Attorney, Agent, or Firm* — Pillsbury Winthrop Shaw Pittman LLP

(57) ABSTRACT

Embodiments relates to a fastener having a head portion and an interlock portion comprising a bulk solidifying amorphous alloy comprising a metal alloy. The fastener could further have a screw portion. Other embodiments relate to methods of making and using the fasteners.

20 Claims, 6 Drawing Sheets

3(1)

3(2)

6(1)

Heated threaded substrate with interlock feature at bottom

6(2)

6(3)

6(4)

Head portion
Thread portion
Interlock

FASTENER MADE OF BULK AMORPHOUS ALLOY

FIELD OF THE INVENTION

The present invention relates to tamper resistant fasteners, particularly locking fasteners, wherein at least portion is made of bulk-solidifying amorphous metal alloy.

BACKGROUND

Locking fasteners are generally known and made of conventional metals, such as aluminum, brass, copper and steel, e.g., case hardened steel, as well as 316, 316L and 410 stainless steel. These conventional metals and alloys deform via the formation of dislocations, i.e., plastic work. For these conventional metals, the fabrication processes can mostly be placed into two categories—forming and cutting. Forming processes are those in which the applied force causes the material to plastically deform, but not to fail. Such processes are able to bend or stretch the metal into a desired shape. Cutting processes are those in which the applied force causes the material to fail and separate, allowing the material to be cut or removed. While the currently available fasteners are effective, an ever continuing need exists for tamper resistant fasteners, particularly for electronic devices.

Tampering involves the deliberate altering or breaking open a product, package, or system. Tamper resistance is resistance to tampering by either the normal users of a product, package, or system or others with physical access to it. There are many reasons for employing tamper resistance. Tamper resistance ranges from simple features like screws with special heads, more complex devices that render themselves inoperable or encrypt all data transmissions between individual chips, or use of materials needing special tools and knowledge. Tamper-resistant devices or features are common on packages to deter package or product tampering. In some applications, devices are only tamper-evident rather than tamper-resistant.

It has been argued that it is very difficult to make simple fasteners, particularly for electronic devices, to secure against tampering, because numerous types of attacks are possible. Yet, there is a need for a simple, but effective, tamper resistant fastener that would at least obviate physical tampering or make the fastener, and possibly the device to which the fastener is attached, non-functional if the fastener has been tampered with.

SUMMARY

A proposed solution according to embodiments herein for tamper resistance is a fastener having a head portion and a tamper resistant bulk-solidifying amorphous alloy interlock portion, wherein the fastener and the substrate into which the fastener is fitted into are permanently fastened via an interlock formed from the interlock portion during the fastening process.

DETAILED DESCRIPTION

All publications, patents, and patent applications cited in this Specification are hereby incorporated by reference in their entirety.

The articles "a" and "an" are used herein to refer to one or to more than one (i.e., to at least one) of the grammatical object of the article. By way of example, "a polymer resin" means one polymer resin or more than one polymer resin. Any ranges cited herein are inclusive. The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Bulk-solidifying amorphous alloys, or bulk metallic glasses ("BMG"), are a recently developed class of metallic materials. These alloys may be solidified and cooled at relatively slow rates, and they retain the amorphous, non-crystalline (i.e., glassy) state at room temperature. Amorphous alloys have many superior properties than their crystalline counterparts. However, if the cooling rate is not sufficiently high, crystals may form inside the alloy during cooling, so that the benefits of the amorphous state can be lost. For example, one challenge with the fabrication of bulk amorphous alloy parts is partial crystallization of the parts due to either slow cooling or impurities in the raw alloy material. As a high degree of amorphicity (and, conversely, a low degree of crystallinity) is desirable in BMG parts, there is a need to develop methods for casting BMG parts having controlled amount of amorphicity.

Figure 1:
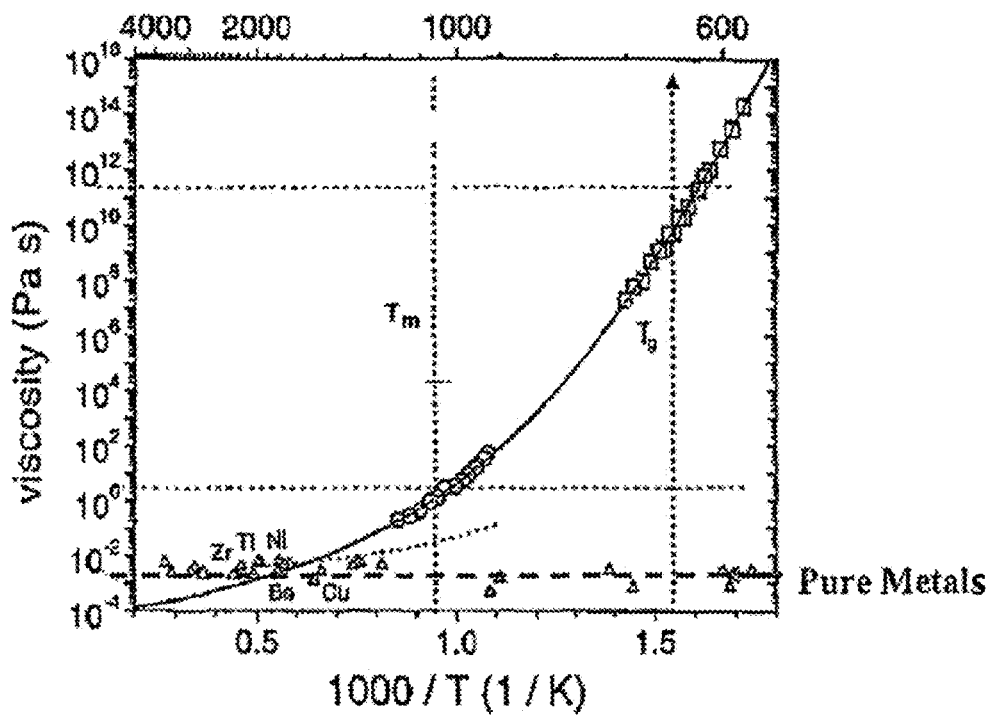
FIG. 1 provides a temperature-viscosity diagram of an exemplary bulk solidifying amorphous alloy.

FIG. 1 (obtained from U.S. Pat. No. 7,575,040) shows a viscosity-temperature graph of an exemplary bulk solidifying amorphous alloy, from the VIT-001 series of Zr—Ti—Ni—Cu—Be family manufactured by Liquidmetal Technology. It should be noted that there is no clear liquid/solid transformation for a bulk solidifying amorphous metal during the formation of an amorphous solid. The molten alloy becomes more and more viscous with increasing undercooling until it approaches solid form around the glass transition temperature. Accordingly, the temperature of solidification front for bulk solidifying amorphous alloys can be around glass transition temperature, where the alloy will practically act as a solid for the purposes of pulling out the quenched amorphous sheet product.

Figure 2:
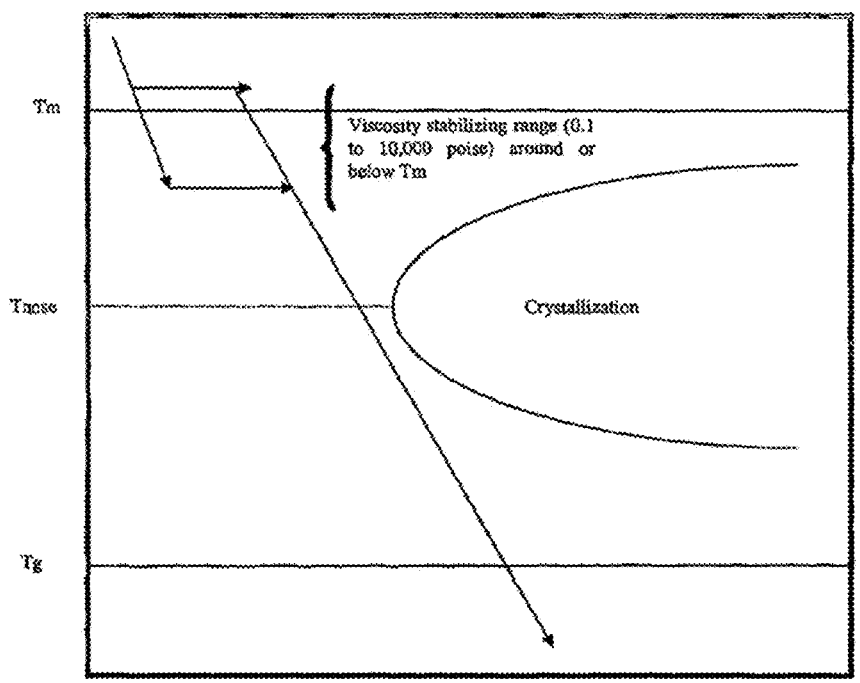
FIG. 2 provides a schematic of a time-temperature-transformation (TTT) diagram for an exemplary bulk solidifying amorphous alloy.

FIG. 2 (obtained from U.S. Pat. No. 7,575,040) shows the time-temperature-transformation (TTT) cooling curve of an exemplary bulk solidifying amorphous alloy, or TTT diagram. Bulk-solidifying amorphous metals do not experience a liquid/solid crystallization transformation upon cooling, as with conventional metals. Instead, the highly fluid, non crystalline form of the metal found at high temperatures (near a "melting temperature" Tm) becomes more viscous as the temperature is reduced (near to the glass transition temperature Tg), eventually taking on the outward physical properties of a conventional solid.

Even though there is no liquid/crystallization transformation for a bulk solidifying amorphous metal, a "melting temperature" Tm may be defined as the thermodynamic liquidus temperature of the corresponding crystalline phase. Under this regime, the viscosity of bulk-solidifying amorphous alloys at the melting temperature could lie in the range of about 0.1 poise to about 10,000 poise, and even sometimes under 0.01 poise. A lower viscosity at the "melting temperature" could provide faster and complete filling of intricate portions of the shell/mold with a bulk solidifying amorphous metal for forming the BMG parts. Furthermore, the cooling rate of the molten metal to form a BMG part has to such that the time-temperature profile during cooling does not traverse through the nose-shaped region bounding the crystallized region in the TTT diagram of FIG. 2. In FIG. 2, Tnose is the critical crystallization temperature Tx where crystallization is most rapid and occurs in the shortest time scale.

The supercooled liquid region, the temperature region between Tg and Tx is a manifestation of the extraordinary stability against crystallization of bulk solidification alloys. In this temperature region the bulk solidifying alloy can exist as a high viscous liquid. The viscosity of the bulk solidifying alloy in the supercooled liquid region can vary between $10^{12}$ Pa s at the glass transition temperature down to $10^5$ Pa s at the crystallization temperature, the high temperature limit of the supercooled liquid region. Liquids with such viscosities can undergo substantial plastic strain under an applied pressure. The embodiments herein make use of the large plastic formability in the supercooled liquid region as a forming and separating method.

One needs to clarify something about Tx. Technically, the nose-shaped curve shown in the TTT diagram describes Tx as a function of temperature and time. Thus, regardless of the trajectory that one takes while heating or cooling a metal alloy, when one hits the TTT curve, one has reached Tx. In FIG. 2, Tx is shown as a dashed line as Tx can vary from close to Tm to close to Tg.

The schematic TTT diagram of FIG. 2 shows processing methods of die casting from at or above Tm to below Tg without the time-temperature trajectory (shown as (1) as an example trajectory) hitting the TTT curve. During die casting, the forming takes place substantially simultaneously with fast cooling to avoid the trajectory hitting the TTT curve. The processing methods for superplastic forming (SPF), also referred to as thermoplastic forming, from at or below Tg to below Tm without the time-temperature trajectory (shown as (2), (3) and (4) as example trajectories) hitting the TTT curve. In SPF, the amorphous BMG is reheated into the supercooled liquid region where the available processing window could be much larger than die casting, resulting in better controllability of the process. The SPF process does not require fast cooling to avoid crystallization during cooling. Also, as shown by example trajectories (2), (3) and (4), the SPF can be carried out with the highest temperature during SPF being above Tnose or below Tnose, up to about Tm. If one heats up a piece of amorphous alloy but manages to avoid hitting the TTT curve, you have heated "between Tg and Tm", but one could have not reached Tx.

Typical differential scanning calorimeter (DSC) heating curves of bulk-solidifying amorphous alloys taken at a heating rate of 20 degree C./min describe, for the most part, a particular trajectory across the TTT data where one could likely see a Tg at a certain temperature, a Tx when the DSC heating ramp crosses the TTT crystallization onset, and eventually melting peaks when the same trajectory crosses the temperature range for melting. If one heats a bulk-solidifying amorphous alloy at a rapid heating rate as shown by the ramp up portion of trajectories (2), (3) and (4) in FIG. 2, then one could avoid the TTT curve entirely, and the DSC data could show a glass transition but no Tx upon heating. Another way to think about it is trajectories (2), (3) and (4) can fall anywhere in temperature between the nose of the TTT curve (and even above it) and the Tg line, as long as it does not hit the crystallization curve. That just means that the horizontal plateau in trajectories might get much shorter as one increases the processing temperature.

Phase

The term "phase" herein can refer to one that can be found in a thermodynamic phase diagram. A phase is a region of space (e.g., a thermodynamic system) throughout which all physical properties of a material are essentially uniform. Examples of physical properties include density, index of refraction, chemical composition and lattice periodicity. A simple description of a phase is a region of material that is chemically uniform, physically distinct, and/or mechanically separable. For example, in a system consisting of ice and water in a glass jar, the ice cubes are one phase, the water is a second phase, and the humid air over the water is a third phase. The glass of the jar is another separate phase. A phase can refer to a solid solution, which can be a binary, tertiary, quaternary, or more, solution, or a compound, such as an intermetallic compound. As another example, an amorphous phase is distinct from a crystalline phase.

Metal, Transition Metal, and Non-Metal

The term "metal" refers to an electropositive chemical element. The term "element" in this Specification refers generally to an element that can be found in a Periodic Table. Physically, a metal atom in the ground state contains a partially filled band with an empty state close to an occupied state. The term "transition metal" is any of the metallic elements within Groups 3 to 12 in the Periodic Table that have an incomplete inner electron shell and that serve as transitional links between the most and the least electropositive in a series of elements. Transition metals are characterized by multiple valences, colored compounds, and the ability to form stable complex ions. The term "nonmetal" refers to a chemical element that does not have the capacity to lose electrons and form a positive ion.

Depending on the application, any suitable nonmetal elements, or their combinations, can be used. The alloy (or "alloy composition") can comprise multiple nonmetal elements, such as at least two, at least three, at least four, or more, nonmetal elements. A nonmetal element can be any element that is found in Groups 13-17 in the Periodic Table. For example, a nonmetal element can be any one of F, Cl, Br, I, At, O, S, Se, Te, Po, N, P, As, Sb, Bi, C, Si, Ge, Sn, Pb, and B. Occasionally, a nonmetal element can also refer to certain metalloids (e.g., B, Si, Ge, As, Sb, Te, and Po) in Groups 13-17. In one embodiment, the nonmetal elements can include B, Si, C, P, or combinations thereof. Accordingly, for example, the alloy can comprise a boride, a carbide, or both.

A transition metal element can be any of scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, mercury, rutherfordium, dubnium, seaborgium, bohrium, hassium, meitnerium, ununnilium, unununium, and ununbium. In one embodiment, a BMG containing a transition metal element can have at least one of Sc, Y, La, Ac, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, and Hg. Depending on the application, any suitable transitional metal elements, or their combinations, can be used. The alloy composition can comprise multiple transitional metal elements, such as at least two, at least three, at least four, or more, transitional metal elements.

The presently described alloy or alloy "sample" or "specimen" alloy can have any shape or size. For example, the alloy can have a shape of a particulate, which can have a shape such as spherical, ellipsoid, wire-like, rod-like, sheet-like, flake-like, or an irregular shape. The particulate can have any size. For example, it can have an average diameter of between about 1 micron and about 100 microns, such as between about 5 microns and about 80 microns, such as between about 10 microns and about 60 microns, such as between about 15 microns and about 50 microns, such as between about 15 microns and about 45 microns, such as between about 20 microns and about 40 microns, such as between about 25 microns and about 35 microns. For example, in one embodiment, the average diameter of the particulate is between about 25 microns and about 44 microns. In some embodiments, smaller particulates, such as those in the nanometer range, or larger particulates, such as those bigger than 100 microns, can be used.

The alloy sample or specimen can also be of a much larger dimension. For example, it can be a bulk structural component, such as an ingot, housing/casing of an electronic device or even a portion of a structural component that has dimensions in the millimeter, centimeter, or meter range.

Solid Solution

The term "solid solution" refers to a solid form of a solution. The term "solution" refers to a mixture of two or more substances, which may be solids, liquids, gases, or a combination of these. The mixture can be homogeneous or heterogeneous. The term "mixture" is a composition of two or more substances that are combined with each other and are generally capable of being separated. Generally, the two or more substances are not chemically combined with each other.

Alloy

In some embodiments, the alloy composition described herein can be fully alloyed. In one embodiment, an "alloy" refers to a homogeneous mixture or solid solution of two or more metals, the atoms of one replacing or occupying interstitial positions between the atoms of the other; for example, brass is an alloy of zinc and copper. An alloy, in contrast to a composite, can refer to a partial or complete solid solution of one or more elements in a metal matrix, such as one or more compounds in a metallic matrix. The term alloy herein can refer to both a complete solid solution alloy that can give single solid phase microstructure and a partial solution that can give two or more phases. An alloy composition described herein can refer to one comprising an alloy or one comprising an alloy-containing composite.

Thus, a fully alloyed alloy can have a homogenous distribution of the constituents, be it a solid solution phase, a compound phase, or both. The term "fully alloyed" used herein can account for minor variations within the error tolerance. For example, it can refer to at least 90% alloyed, such as at least 95% alloyed, such as at least 99% alloyed, such as at least 99.5% alloyed, such as at least 99.9% alloyed. The percentage herein can refer to either volume percent or weight percentage, depending on the context. These percentages can be balanced by impurities, which can be in terms of composition or phases that are not a part of the alloy.

Amorphous or Non-Crystalline Solid

An "amorphous" or "non-crystalline solid" is a solid that lacks lattice periodicity, which is characteristic of a crystal. As used herein, an "amorphous solid" includes "glass" which is an amorphous solid that softens and transforms into a liquid-like state upon heating through the glass transition. Generally, amorphous materials lack the long-range order characteristic of a crystal, though they can possess some short-range order at the atomic length scale due to the nature of chemical bonding. The distinction between amorphous solids and crystalline solids can be made based on lattice periodicity as determined by structural characterization techniques such as x-ray diffraction and transmission electron microscopy.

The terms "order" and "disorder" designate the presence or absence of some symmetry or correlation in a many-particle system. The terms "long-range order" and "short-range order" distinguish order in materials based on length scales.

The strictest form of order in a solid is lattice periodicity: a certain pattern (the arrangement of atoms in a unit cell) is repeated again and again to form a translationally invariant tiling of space. This is the defining property of a crystal. Possible symmetries have been classified in 14 Bravais lattices and 230 space groups.

Lattice periodicity implies long-range order. If only one unit cell is known, then by virtue of the translational symmetry it is possible to accurately predict all atomic positions at arbitrary distances. The converse is generally true, except, for example, in quasi-crystals that have perfectly deterministic tilings but do not possess lattice periodicity.

Long-range order characterizes physical systems in which remote portions of the same sample exhibit correlated behavior. This can be expressed as a correlation function, namely the spin-spin correlation function: $G(x,x') = \langle s(x), s(x') \rangle$.

In the above function, s is the spin quantum number and x is the distance function within the particular system. This function is equal to unity when $x=x'$ and decreases as the distance $|x-x'|$ increases. Typically, it decays exponentially to zero at large distances, and the system is considered to be disordered. If, however, the correlation function decays to a constant value at large $|x-x'|$, then the system can be said to possess long-range order. If it decays to zero as a power of the distance, then it can be called quasi-long-range order. Note that what constitutes a large value of $|x-x'|$ is relative.

A system can be said to present quenched disorder when some parameters defining its behavior are random variables that do not evolve with time (i.e., they are quenched or frozen)—e.g., spin glasses. It is opposite to annealed disorder, where the random variables are allowed to evolve themselves. Embodiments herein include systems comprising quenched disorder.

The alloy described herein can be crystalline, partially crystalline, amorphous, or substantially amorphous. For example, the alloy sample/specimen can include at least some crystallinity, with grains/crystals having sizes in the nanometer and/or micrometer ranges. Alternatively, the alloy can be substantially amorphous, such as fully amorphous. In one embodiment, the alloy composition is at least substantially not amorphous, such as being substantially crystalline, such as being entirely crystalline.

In one embodiment, the presence of a crystal or a plurality of crystals in an otherwise amorphous alloy can be construed as a "crystalline phase" therein. The degree of crystallinity (or "crystallinity" for short in some embodiments) of an alloy can refer to the amount of the crystalline phase present in the alloy. The degree can refer to, for example, a fraction of crystals present in the alloy. The fraction can refer to volume fraction or weight fraction, depending on the context. A measure of how "amorphous" an amorphous alloy is can be amorphicity. Amorphicity can be measured in terms of a degree of crystallinity. For example, in one embodiment, an alloy having a low degree of crystallinity can be said to have a high degree of amorphicity. In one embodiment, for example, an alloy having 60 vol % crystalline phase can have a 40 vol % amorphous phase.

Amorphous Alloy or Amorphous Metal

An "amorphous alloy" is an alloy having an amorphous content of more than 50% by volume, preferably more than 90% by volume of amorphous content, more preferably more than 95% by volume of amorphous content, and most preferably more than 99% to almost 100% by volume of amorphous content. Note that, as described above, an alloy high in amorphicity is equivalently low in degree of crystallinity. An "amorphous metal" is an amorphous metal material with a disordered atomic-scale structure. In contrast to most metals, which are crystalline and therefore have a highly ordered arrangement of atoms, amorphous alloys are non-crystalline. Materials in which such a disordered structure is produced directly from the liquid state during cooling are sometimes referred to as "glasses." Accordingly, amorphous metals are commonly referred to as "metallic glasses" or "glassy metals." In one embodiment, a bulk metallic glass ("BMG") can refer to an alloy, of which the microstructure is at least partially amorphous. However, there are several ways besides extremely rapid cooling to produce amorphous metals, including physical vapor deposition, solid-state reaction, ion irradiation, melt spinning, and mechanical alloying. Amorphous alloys can be a single class of materials, regardless of how they are prepared.

Amorphous metals can be produced through a variety of quick-cooling methods. For instance, amorphous metals can be produced by sputtering molten metal onto a spinning metal disk. The rapid cooling, on the order of millions of degrees a second, can be too fast for crystals to form, and the material is thus "locked in" a glassy state. Also, amorphous metals/alloys can be produced with critical cooling rates low enough to allow formation of amorphous structures in thick layers—e.g., bulk metallic glasses.

The terms "bulk metallic glass" ("BMG"), bulk amorphous alloy ("BAA"), and bulk solidifying amorphous alloy are used interchangeably herein. They refer to amorphous alloys having the smallest dimension at least in the millimeter range. For example, the dimension can be at least about 0.5 mm, such as at least about 1 mm, such as at least about 2 mm, such as at least about 4 mm, such as at least about 5 mm, such as at least about 6 mm, such as at least about 8 mm, such as at least about 10 mm, such as at least about 12 mm. Depending on the geometry, the dimension can refer to the diameter, radius, thickness, width, length, etc. A BMG can also be a metallic glass having at least one dimension in the centimeter range, such as at least about 1.0 cm, such as at least about 2.0 cm, such as at least about 5.0 cm, such as at least about 10.0 cm. In some embodiments, a BMG can have at least one dimension at least in the meter range. A BMG can take any of the shapes or forms described above, as related to a metallic glass. Accordingly, a BMG described herein in some embodiments can be different from a thin film made by a conventional deposition technique in one important aspect—the former can be of a much larger dimension than the latter.

Amorphous metals can be an alloy rather than a pure metal. The alloys may contain atoms of significantly different sizes, leading to low free volume (and therefore having viscosity up to orders of magnitude higher than other metals and alloys) in a molten state. The viscosity prevents the atoms from moving enough to form an ordered lattice. The material structure may result in low shrinkage during cooling and resistance to plastic deformation. The absence of grain boundaries, the weak spots of crystalline materials in some cases, may, for example, lead to better resistance to wear and corrosion. In one embodiment, amorphous metals, while technically glasses, may also be much tougher and less brittle than oxide glasses and ceramics.

Thermal conductivity of amorphous materials may be lower than that of their crystalline counterparts. To achieve formation of an amorphous structure even during slower cooling, the alloy may be made of three or more components, leading to complex crystal units with higher potential energy and lower probability of formation. The formation of amorphous alloy can depend on several factors: the composition of the components of the alloy; the atomic radius of the components (preferably with a significant difference of over 12% to achieve high packing density and low free volume); and the negative heat of mixing the combination of components, inhibiting crystal nucleation and prolonging the time the molten metal stays in a supercooled state. However, as the formation of an amorphous alloy is based on many different variables, it can be difficult to make a prior determination of whether an alloy composition could form an amorphous alloy.

Amorphous alloys, for example, of boron, silicon, phosphorus, and other glass formers with magnetic metals (iron, cobalt, nickel) may be magnetic, with low coercivity and high electrical resistance. The high resistance leads to low losses by eddy currents when subjected to alternating magnetic fields, a property useful, for example, as transformer magnetic cores.

Amorphous alloys may have a variety of potentially useful properties. In particular, they tend to be stronger than crystalline alloys of similar chemical composition, and they can sustain larger reversible ("elastic") deformations than crystalline alloys. Amorphous metals derive their strength directly from their non-crystalline structure, which can have none of the defects (such as dislocations) that limit the strength of crystalline alloys. For example, one modern amorphous metal, known as Vitreloy™, has a tensile strength that is almost twice that of high-grade titanium. In some embodiments, metallic glasses at room temperature are not ductile and tend to fail suddenly when loaded in tension, which limits the material applicability in reliability-critical applications, as the impending failure is not evident. Therefore, to overcome this challenge, metal matrix composite materials having a metallic glass matrix containing dendritic particles or fibers of a ductile crystalline metal can be used. Alternatively, a BMG low in element(s) that tend to cause embitterment (e.g., Ni) can be used. For example, a Ni-free BMG can be used to improve the ductility of the BMG.

Another useful property of bulk amorphous alloys is that they can be true glasses; in other words, they can soften and flow upon heating. This can allow for easy processing, such as by injection molding, in much the same way as polymers. As a result, amorphous alloys can be used for making sports equipment, medical devices, electronic components and equipment, and thin films. Thin films of amorphous metals can be deposited as protective coatings via a high velocity oxygen fuel technique.

A material can have an amorphous phase, a crystalline phase, or both. The amorphous and crystalline phases can have the same chemical composition and differ only in the microstructure—i.e., one amorphous and the other crystalline. Microstructure in one embodiment refers to the structure of a material as revealed by a microscope at 25× magnification or higher. Alternatively, the two phases can have different chemical compositions and microstructures. For example, a composition can be partially amorphous, substantially amorphous, or completely amorphous.

As described above, the degree of amorphicity (and conversely the degree of crystallinity) can be measured by fraction of crystals present in the alloy. The degree can refer to volume fraction of weight fraction of the crystalline phase present in the alloy. A partially amorphous composition can refer to a composition of at least about 5 vol % of which is of an amorphous phase, such as at least about 10 vol %, such as at least about 20 vol %, such as at least about 40 vol %, such as at least about 60 vol %, such as at least about 80 vol %, such as at least about 90 vol %. The terms "substantially" and "about" have been defined elsewhere in this application. Accordingly, a composition that is at least substantially amorphous can refer to one of which at least about 90 vol % is amorphous, such as at least about 95 vol %, such as at least about 98 vol %, such as at least about 99 vol %, such as at least about 99.5 vol %, such as at least about 99.8 vol %, such as at least about 99.9 vol %. In one embodiment, a substantially amorphous composition can have some incidental, insignificant amount of crystalline phase present therein.

In one embodiment, an amorphous alloy composition can be homogeneous with respect to the amorphous phase. A substance that is uniform in composition is homogeneous. This is in contrast to a substance that is heterogeneous. The term "composition" refers to the chemical composition and/or microstructure in the substance. A substance is homogeneous when a volume of the substance is divided in half and both halves have substantially the same composition. For example, a particulate suspension is homogeneous when a volume of the particulate suspension is divided in half and both halves have substantially the same volume of particles. However, it might be possible to see the individual particles under a microscope. Another example of a homogeneous substance is air where different ingredients therein are equally suspended, though the particles, gases and liquids in air can be analyzed separately or separated from air.

A composition that is homogeneous with respect to an amorphous alloy can refer to one having an amorphous phase substantially uniformly distributed throughout its microstructure. In other words, the composition macroscopically comprises a substantially uniformly distributed amorphous alloy throughout the composition. In an alternative embodiment, the composition can be of a composite, having an amorphous phase having therein a non-amorphous phase. The non-amorphous phase can be a crystal or a plurality of crystals. The crystals can be in the form of particulates of any shape, such as spherical, ellipsoid, wire-like, rod-like, sheet-like, flake-like, or an irregular shape. In one embodiment, it can have a dendritic form. For example, an at least partially amorphous composite composition can have a crystalline phase in the shape of dendrites dispersed in an amorphous phase matrix; the dispersion can be uniform or non-uniform, and the amorphous phase and the crystalline phase can have the same or a different chemical composition. In one embodiment, they have substantially the same chemical composition. In another embodiment, the crystalline phase can be more ductile than the BMG phase.

The methods described herein can be applicable to any type of amorphous alloy. Similarly, the amorphous alloy described herein as a constituent of a composition or article can be of any type. The amorphous alloy can comprise the element Zr, Hf, Ti, Cu, Ni, Pt, Pd, Fe, Mg, Au, La, Ag, Al, Mo, Nb, Be, or combinations thereof. Namely, the alloy can include any combination of these elements in its chemical formula or chemical composition. The elements can be present at different weight or volume percentages. For example, an iron "based" alloy can refer to an alloy having a non-insignificant weight percentage of iron present therein, the weight percent can be, for example, at least about 20 wt %, such as at least about 40 wt %, such as at least about 50 wt %, such as at least about 60 wt %, such as at least about 80 wt %. Alternatively, in one embodiment, the above-described percentages can be volume percentages, instead of weight percentages. Accordingly, an amorphous alloy can be zirconium-based, titanium-based, platinum-based, palladium-based, gold-based, silver-based, copper-based, iron-based, nickel-based, aluminum-based, molybdenum-based, and the like. The alloy can also be free of any of the aforementioned elements to suit a particular purpose. For example, in some embodiments, the alloy, or the composition including the alloy, can be substantially free of nickel, aluminum, titanium, beryllium, or combinations thereof. In one embodiment, the alloy or the composite is completely free of nickel, aluminum, titanium, beryllium, or combinations thereof.

For example, the amorphous alloy can have the formula $(Zr, Ti)_a(Ni, Cu, Fe)_b(Be, Al, Si, B)_c$, wherein a, b, and c each represents a weight or atomic percentage. In one embodiment, a is in the range of from 30 to 75, b is in the range of from 5 to 60, and c is in the range of from 0 to 50 in atomic percentages. Alternatively, the amorphous alloy can have the formula $(Zr, Ti)_a(Ni, Cu)_b(Be)_c$, wherein a, b, and c each represents a weight or atomic percentage. In one embodiment, a is in the range of from 40 to 75, b is in the range of from 5 to 50, and c is in the range of from 5 to 50 in atomic percentages. The alloy can also have the formula $(Zr, Ti)_a(Ni, Cu)_b(Be)_c$, wherein a, b, and c each represents a weight or atomic percentage. In one embodiment, a is in the range of from 45 to 65, b is in the range of from 7.5 to 35, and c is in the range of from 10 to 37.5 in atomic percentages. Alternatively, the alloy can have the formula $(Zr)_a(Nb, Ti)_b(Ni, Cu)_c(Al)_d$, wherein a, b, c, and d each represents a weight or atomic percentage. In one embodiment, a is in the range of from 45 to 65, b is in the range of from 0 to 10, c is in the range of from 20 to 40 and d is in the range of from 7.5 to 15 in atomic percentages. One exemplary embodiment of the afore-described alloy system is a Zr—Ti—Ni—Cu—Be based amorphous alloy under the trade name Vitreloy™, such as Vitreloy-1 and Vitreloy-101, as fabricated by Liquidmetal Technologies, CA, USA. Some examples of amorphous alloys of the different systems are provided in Table 1 and Table 2.

TABLE 1

Exemplary amorphous alloy compositions

| Alloy | Atm % | Atm % | Atm % | Atm % | Atm % | Atm % | Atm % | Atm % |
|---|---|---|---|---|---|---|---|---|
| 1 | Fe | Mo | Ni | Cr | P | C | B | |
| | 68.00% | 5.00% | 5.00% | 2.00% | 12.50% | 5.00% | 2.50% | |
| 2 | Fe | Mo | Ni | Cr | P | C | B | Si |

TABLE 1-continued

Exemplary amorphous alloy compositions

| Alloy | Atm % | Atm % | Atm % | Atm % | Atm % | Atm % | Atm % | Atm % |
|---|---|---|---|---|---|---|---|---|
| 3 | 68.00% Pd | 5.00% Cu | 5.00% Co | 2.00% P | 11.00% | 5.00% | 2.50% | 1.50% |
| 4 | 44.48% Pd | 32.35% Ag | 4.05% Si | 19.11% P | | | | |
| 5 | 77.50% Pd | 6.00% Ag | 9.00% Si | 7.50% P | | | | |
| 5 | 79.00% Pd | 3.50% Ag | 9.50% Si | 6.00% P | 2.00% Ge | | | |
| 5 | 74.70% Pt | 1.50% Cu | 0.30% Ag | 18.0% P | 4.00% B | 1.50% Si | | |

TABLE 2

Additional Exemplary amorphous alloy compositions (atomic %)

| Alloy | Atm % | Atm % | Atm % | Atm % | Atm % | Atm % |
|---|---|---|---|---|---|---|
| 1 | Zr 41.20% | Ti 13.80% | Cu 12.50% | Ni 10.00% | Be 22.50% | |
| 2 | Zr 44.00% | Ti 11.00% | Cu 10.00% | Ni 10.00% | Be 25.00% | |
| 3 | Zr 56.25% | Ti 11.25% | Cu 6.88% | Ni 5.63% | Nb 7.50% | Be 12.50% |
| 4 | Zr 64.75% | Ti 5.60% | Cu 14.90% | Ni 11.15% | Al 2.60% | Be 1.00% |
| 5 | Zr 52.50% | Ti 5.00% | Cu 17.90% | Ni 14.60% | Al 10.00% | |
| 6 | Zr 57.00% | Nb 5.00% | Cu 15.40% | Ni 12.60% | Al 10.00% | |
| 7 | Zr 50.75% | Cu 36.23% | Ni 4.03% | Al 9.00% | | |
| 8 | Zr 46.75% | Ti 8.25% | Cu 7.50% | Ni 10.00% | Be 27.50% | |
| 9 | Zr 21.67% | Ti 43.33% | Ni 7.50% | Be 27.50% | | |
| 10 | Zr 35.00% | Ti 30.00% | Cu 7.50% | Be 27.50% | | |
| 11 | Zr 35.00% | Ti 30.00% | Co 6.00% | Be 29.00% | | |
| 12 | Zr 35.00% | Ti 30.00% | Fe 2.00% | Be 33.00% | | |
| 13 | Au 49.00% | Ag 5.50% | Pd 2.30% | Cu 26.90% | Si 16.30% | |
| 14 | Au 50.90% | Ag 3.00% | Pd 2.30% | Cu 27.80% | Si 16.00% | |
| 15 | Pt 57.50% | Cu 14.70% | Ni 5.30% | P 22.50% | | |
| 16 | Zr 36.60% | Ti 31.40% | Nb 7.00% | Cu 5.90% | Be 19.10% | |
| 17 | Zr 38.30% | Ti 32.90% | Nb 7.30% | Cu 6.20% | Be 15.30% | |
| 18 | Zr 39.60% | Ti 33.90% | Nb 7.60% | Cu 6.40% | Be 12.50% | |
| 19 | Cu 47.00% | Ti 34.00% | Zr 11.00% | Ni 8.00% | | |
| 20 | Zr 55.00% | Co 25.00% | Al 20.00% | | | |

Other exemplary ferrous metal-based alloys include compositions such as those disclosed in U.S. Patent Application Publication Nos. 2007/0079907 and 2008/0118387. These compositions include the Fe(Mn, Co, Ni, Cu) (C, Si, B, P, Al) system, wherein the Fe content is from 60 to 75 atomic percentage, the total of (Mn, Co, Ni, Cu) is in the range of from 5 to 25 atomic percentage, and the total of (C, Si, B, P, Al) is in the range of from 8 to 20 atomic percentage, as well as the exemplary composition Fe48Cr15Mo14Y2C15B6. They also include the alloy systems described by Fe—Cr—Mo—(Y,Ln)—C—B, Co—Cr—Mo-Ln-C—B, Fe—Mn—Cr—Mo—(Y,Ln)—C—B, (Fe, Cr, Co)—(Mo,Mn)—(C,B)—Y, Fe—(Co,Ni)—(Zr,Nb,Ta)—(Mo,W)—B, Fe—(Al,Ga)—(P,C,B,Si,Ge), Fe—(Co, Cr,Mo,Ga,Sb)—P—B—C, (Fe, Co)—B—Si—Nb alloys, and Fe—(Cr—Mo)—(C,B)—Tm, where Ln denotes a lanthanide element and Tm denotes a transition metal element. Furthermore, the amorphous alloy can also be one of the exemplary compositions Fe80P12.5C5B2.5, Fe80P11C5B2.5Si1.5, Fe74.5Mo5.5P12.5C5B2.5, Fe74.5Mo5.5P11C5B2.5Si1.5, Fe70Mo5Ni5P12.5C5B2.5, Fe70Mo5Ni5P11C5B2.5Si1.5, Fe68Mo5Ni5Cr2P12.5C5B2.5, and Fe68Mo5Ni5Cr2P11C5B2.5Si1.5, described in U.S. Patent Application Publication No. 2010/0300148.

The amorphous alloys can also be ferrous alloys, such as (Fe, Ni, Co) based alloys. Examples of such compositions are disclosed in U.S. Pat. Nos. 6,325,868; 5,288,344; 5,368,659; 5,618,359; and 5,735,975, Inoue et al., Appl. Phys. Lett., Volume 71, p 464 (1997), Shen et al., Mater. Trans., JIM, Volume 42, p 2136 (2001), and Japanese Patent Application No. 200126277 (Pub. No. 2001303218 A). One exemplary composition is Fe72Al5Ga2P11C6B4. Another example is Fe72Al7Zr10Mo5W2B15. Another iron-based alloy system that can be used in the coating herein is disclosed in U.S. Patent Application Publication No. 2010/0084052, wherein the amorphous metal contains, for example, manganese (1 to 3 atomic %), yttrium (0.1 to 10 atomic %), and silicon (0.3 to 3.1 atomic %) in the range of composition given in parentheses; and that contains the following elements in the specified range of composition given in parentheses: chromium (15 to 20 atomic %), molybdenum (2 to 15 atomic %), tungsten (1 to 3 atomic %), boron (5 to 16 atomic %), carbon (3 to 16 atomic %), and the balance iron.

The aforedescribed amorphous alloy systems can further include additional elements, such as additional transition metal elements, including Nb, Cr, V, and Co. The additional elements can be present at less than or equal to about 30 wt %, such as less than or equal to about 20 wt %, such as less than or equal to about 10 wt %, such as less than or equal to about 5 wt %. In one embodiment, the additional, optional element is at least one of cobalt, manganese, zirconium, tantalum, niobium, tungsten, yttrium, titanium, vanadium and hafnium to form carbides and further improve wear and corrosion resistance. Further optional elements may include phosphorous, germanium and arsenic, totaling up to about 2%, and preferably less than 1%, to reduce melting point. Otherwise incidental impurities should be less than about 2% and preferably 0.5%.

In some embodiments, a composition having an amorphous alloy can include a small amount of impurities. The impurity elements can be intentionally added to modify the properties of the composition, such as improving the mechanical properties (e.g., hardness, strength, fracture mechanism, etc.) and/or improving the corrosion resistance. Alternatively, the impurities can be present as inevitable, incidental impurities, such as those obtained as a byproduct of processing and manufacturing. The impurities can be less than or equal to about 10 wt %, such as about 5 wt %, such as about 2 wt %, such as about 1 wt %, such as about 0.5 wt %, such as about 0.1 wt %. In some embodiments, these percentages can be volume percentages instead of weight percentages. In one embodiment, the alloy sample/composition consists essentially of the amorphous alloy (with only a small incidental amount of impurities). In another embodiment, the composition includes the amorphous alloy (with no observable trace of impurities).

In one embodiment, the final parts exceeded the critical casting thickness of the bulk solidifying amorphous alloys.

In embodiments herein, the existence of a supercooled liquid region in which the bulk-solidifying amorphous alloy can exist as a high viscous liquid allows for superplastic forming. Large plastic deformations can be obtained. The ability to undergo large plastic deformation in the supercooled liquid region is used for the forming and/or cutting process. As oppose to solids, the liquid bulk solidifying alloy deforms locally which drastically lowers the required energy for cutting and forming. The ease of cutting and forming depends on the temperature of the alloy, the mold, and the cutting tool. As higher is the temperature, the lower is the viscosity, and consequently easier is the cutting and forming.

Embodiments herein can utilize a thermoplastic-forming process with amorphous alloys carried out between Tg and Tx, for example. Herein, Tx and Tg are determined from standard DSC measurements at typical heating rates (e.g. 20° C./min) as the onset of crystallization temperature and the onset of glass transition temperature.

The amorphous alloy components can have the critical casting thickness and the final part can have thickness that is thicker than the critical casting thickness. Moreover, the time and temperature of the heating and shaping operation is selected such that the elastic strain limit of the amorphous alloy could be substantially preserved to be not less than 1.0%, and preferably not being less than 1.5%. In the context of the embodiments herein, temperatures around glass transition means the forming temperatures can be below glass transition, at or around glass transition, and above glass transition temperature, but preferably at temperatures below the crystallization temperature $T_X$. The cooling step is carried out at rates similar to the heating rates at the heating step, and preferably at rates greater than the heating rates at the heating step. The cooling step is also achieved preferably while the forming and shaping loads are still maintained.

Electronic Devices

The embodiments herein can be valuable in the fabrication of electronic devices using a BMG. An electronic device herein can refer to any electronic device known in the art. For example, it can be a telephone, such as a cell phone, and a land-line phone, or any communication device, such as a smart phone, including, for example an iPhone™, and an electronic email sending/receiving device. It can be a part of a display, such as a digital display, a TV monitor, an electronic-book reader, a portable web-browser (e.g., iPad™), and a computer monitor. It can also be an entertainment device, including a portable DVD player, conventional DVD player, Blue-Ray disk player, video game console, music player, such as a portable music player (e.g., iPod™), etc. It can also be a part of a device that provides control, such as controlling the streaming of images, videos, sounds (e.g., Apple TV™), or it can be a remote control for an electronic device. It can be a part of a computer or its accessories, such as the hard drive tower housing or casing, laptop housing, laptop keyboard, laptop track pad, desktop keyboard, mouse, and speaker. The article can also be applied to a device such as a watch or a clock.

Fasteners

A fastener is a hardware device that mechanically joins or affixes two or more objects together. Fasteners can also be used to close a container such as a bag, a box, an enclosure or an envelope; or they may involve keeping together the sides of an opening of flexible material, attaching a lid to a container or a laptop, etc. Fasteners can be temporary, in that they may be fastened and unfastened repeatedly, or permanent, in that they cannot be removed without destroying the fasteners. The fasteners of the embodiments herein are limited to permanent fasteners.

Items like a rope, string, wire (e.g. metal wire, possibly coated with plastic, or multiple parallel wires kept together by a plastic strip coating), cable, chain, or plastic wrap may be used to mechanically join objects; but are not categorized as fasteners according to the embodiments herein because they have additional common uses. Likewise, hinges and springs may join objects together, but are not considered fasteners because their primary purpose is to allow articulation rather than rigid affixment. Other alternative methods of joining materials include crimping, welding, soldering, brazing, taping, gluing, cementing, or the use of other adhesives, but are also not considered fastening according to the fasteners of the embodiments herein. The use of force may also be used for fastening, such as with magnets, vacuum (like suction cups), or even friction, but are not considered fastening according to the fasteners of the embodiments herein.

The fasteners of the embodiments include rotational/threaded fasteners and non-rotational/non-threaded fasteners. The fasteners of the embodiments herein once fastened to a substrate are permanently retained within the substrate using an interlock. The interlock could be a thermoformed bulk solidifying amorphous alloy interlock. The fasteners of the embodiments include bolt, captive fastener, nail, pin (e.g., dowel pin), rivet, self-clinching, snap, threaded fastener (e.g., captive threaded fasteners, nut, screw, screw anchor, stud, threaded insert, threaded rod), wedge anchor and zipper.

A bolt, or screw, is a type of fastener generally characterized by a helical ridge, known as an external thread or just thread, wrapped around a cylinder. Some screw threads are designed to mate with a complementary thread, known as an internal thread, often in the form of a nut or an object that has the internal thread formed into it. Other screw threads are designed to cut a helical groove in a softer material as the screw is inserted. The most common uses of screws are to hold objects together and to position objects. Often screws have a head, which is a specially formed section on one end of the screw that allows it to be turned, or driven. Common tools for driving screws include screwdrivers and wrenches. The head is usually larger than the body of the screw, which keeps the screw from being driven deeper than the length of the screw and to provide a bearing surface. There are exceptions; for instance, carriage bolts have a domed head that is not designed to be driven; set screws have a head smaller than the outer diameter of the screw; J-bolts have a J-shaped head which is not designed to be driven, but rather is usually sunk into solid allowing it to be used as an anchor bolt. The cylindrical portion of the screw from the underside of the head to the tip is known as the shank; it may be fully threaded or partially threaded. The majority of screws are tightened by clockwise rotation, which is termed a right-hand thread. Screws with left-hand threads are used in exceptional cases. For example, when the screw will be subject to counterclockwise torque (which would work to undo a right-hand thread), a left-hand-threaded screw would be an appropriate choice. The left side pedal of a bicycle has a left-hand thread. The left-handed thread screws are also often used for tamper resistant electronic devices.

Captive fasteners are a class of fastener designed for a permanent hold (captivation) within a target assembly or housing, including upon servicing. They provide a secure joining, and avoid fastener loss or damage that might be caused by a loose part. Many captive fasteners use thread locking, press-fitting, or broaching to accomplish their anchor-hold within the larger assembly housing. However, some captive fasteners meld with the material into which they are joined, either through thermoformed interlock.

Dowel fasteners include fluted dowel pins. A fluted dowel pin has a series of parallel grooves cut along its length. The fluting provides channels through which excess bulk solidifying amorphous alloy—which is used to secure the dowel pin in its hole—can escape as the dowel is inserted, thereby relieving the hydraulic pressure that might otherwise split the substrate when the mating pieces are clamped together.

A rivet is a permanent mechanical fastener. Before being installed a rivet consists of a smooth cylindrical shaft with a head on one end. The end opposite the head is called the buck-tail. On installation the rivet is placed in a punched or pre-drilled hole, and the tail is upset, or bucked (i.e. deformed), so that it expands to about 1.5 times the original shaft diameter, holding the rivet in place. To distinguish between the two ends of the rivet, the original head is called the factory head and the deformed end is called the shop head or buck-tail. Because there is effectively a head on each end of an installed rivet, it can support tension loads (loads parallel to the axis of the shaft); however, it is much more capable of supporting shear loads (loads perpendicular to the axis of the shaft). Bolts and screws are better suited for tension applications. There are a number of types of rivets, designed to meet different cost, accessibility, and strength requirements: solid rivets; semi-tubular rivets (also known as tubular rivets) are similar to solid rivets, except they have a partial hole (opposite the head) at the tip; and blind rivets, also known as pop rivets, are tubular and are supplied with a mandrel through the center.

A "self-clinching" nut fastener is also known as PEM nut. It is an internally threaded fastener, that when pressed into ductile metal, displaces the host material around the mounting hole, causing it to cold flow into a specially designed annular recess in the shank of the fastener. A serrated clinching ring prevents the fastener from rotating in the host material once it has been properly inserted. Thus a PEM nut becomes a permanent part of the host material offering strong, load bearing threads in relatively thin sheets of metal.

A snap fastener is a pair of interlocking discs. A circular lip under one disc fits into a groove on the top of the other, permanently holding them fast.

Wedge anchors, also known as expansion bolts and expansion anchors, secure themselves using a wedging effect at the end of the fastener. The wedging effect could be produced by tightening the bolt, resulting in a wedge being drive up against a sleeve, which in turn pushes a softened bulk solidifying amorphous alloy into openings within the substrate to create a mechanical interlock of the alloy with the substrate once the softened bulk solidifying amorphous alloy is cooled. This jams the end of the bolt, and provides the strength.

Zippers include airtight and watertight zippers that could be used sealing electronic devices, for example, the enclosure of a cell phone. An airtight zipper could be built like a standard toothed zipper or could include a molded ridge seal similar to the mating surfaces such as that in a ziploc bag.

Figure 3:
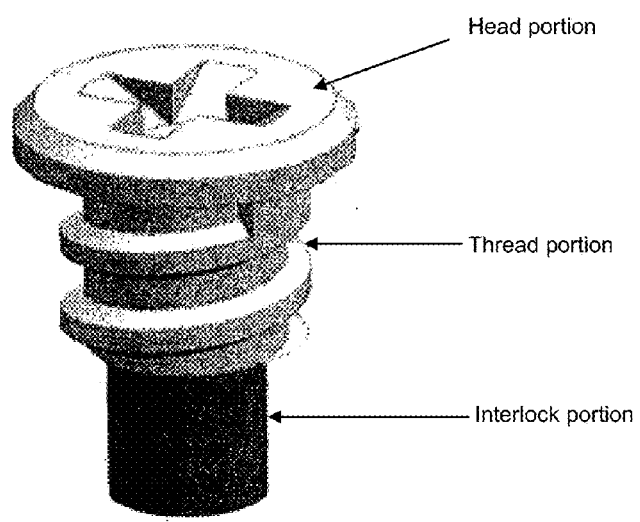
FIG. 3(1) provides a schematic of an exemplary fastener and FIG. 3(2) shows a partial cut section of the fastener of FIG. 3(1).
Figure 3:
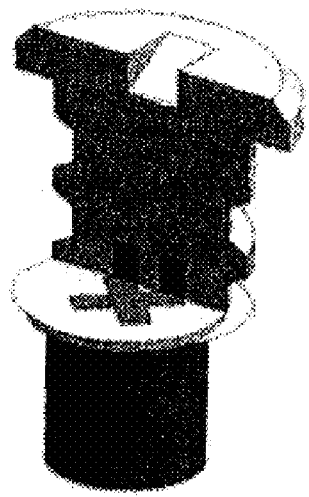

One embodiment of the fasteners is shown in FIGS. 3(1) and 3(2), where FIG. 3(2) shows a partial cut away of the fastener. While the fastener of FIG. 3(1) is a threaded rotational fastener having a non-amorphous head portion and an amorphous interlock portion to form an interlock after fastening the fastener to a substrate, the fasteners of the embodiments are not limited to this design. The possibilities include all of the different types of fasteners described above. Yet other possibilities include: the head and the interlock portion have the same composition and same amorphicity; the head and the interlock portion have the same composition and different amorphicity, e.g., the head is crystalline while the interlock portion is amorphous; and the head and the interlock portion have different compositions and different amorphicity, e.g., the head is made of steel while the interlock portion is an amorphous alloy such as a zirconium or titanium based bulk solidifying amorphous alloy.

Manufacture of the Fasteners

There are several ways to manufacture the fasteners of the embodiments herein depending on the type of the fastener. For the purpose of elucidation, a two exemplary method are described below for type (a) fastener where the head and the interlock portion have different composition—the head is made of a conventional metal such as steel and the interlock portion is a bulk solidifying amorphous alloy; and type (b) fastener where the head and the interlock portion have the same composition.

Figure 4:
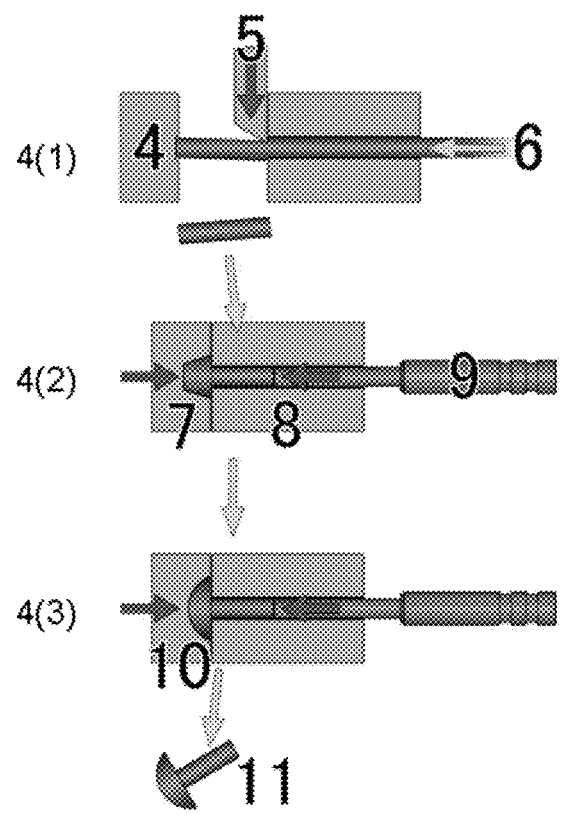
FIGS. 4(1) to 4(3) provide a schematic of a cold forming process for manufacturing the head/screw portion of an exemplary fastener.

For the type (a) fastener, the head is made of a conventional metal using a conventional method of making a bolt/screw. There are three steps in manufacturing a screw: heading, thread rolling, and coating. The heading process is shown in FIGS. 4(1) to 4(3). Screws are normally made from wire, which is supplied in large coils, or round bar stock for larger screws. The wire or rod (blank or bar stock) is then cut to the proper length for the type of screw being made as shown in FIG. 4(1); this workpiece is known as a blank or bar stock. It is then cold headed, which is a cold working process. Heading produces the head of the screw. The shape of the die in the machine dictates what features are pressed into the screw head. For example, a flat head screw uses a flat die as shown in FIG. 4(2) and a round head screw or a rivet uses a round die as shown in FIG. 4(3). For more complicated shapes two heading processes are required to get all of the features into the screw head. This production method is used because heading has a very high production rate, and produces virtually no waste material. Slotted head screws require an extra step to cut the slot in the head; this is done on a slotting machine. These machines are essentially stripped down milling machines designed to process as many blanks as possible. The blanks are then polished again prior to threading. The threads are usually produced via thread rolling, however some are cut. The workpiece is then tumble finished with wood and leather media to do final cleaning and polishing. For most screws a coating, such as hot-dip galvanizing or blackening, is applied to prevent corrosion.

Subsequent to forming the making the metal head of the fastener, the bulk solidifying amorphous alloy interlock portion is joined to the head. The joining of the head portion or screw portion of the fastener to the bulk solidifying amorphous alloy interlock portion to form the interlock portion attached to the head portion or the screw portion could done by either casting the bulk solidifying amorphous alloy interlock portion by a time-temperature profile such as (1) of FIG. 2 (as described in U.S. Pat. No. 6,818,078 ("Joining of Amorphous Metals to Other Metals Utilizing a Cast Mechanical Joint")) or molding the bulk solidifying amorphous alloy interlock portion by a time-temperature profile such as (2) to (4) of FIG. 2 (as described in U.S. Pat. No. 5,482,580 ("Joining of Metals Using a Bulk Amorphous Intermediate Layer")). Both of the above cited U.S. patents are incorporated herein in their entirety by reference.

The joining can be accomplished rapidly by melting and quenching the metal alloy of the bulk solidifying amorphous alloy portion, or relatively more slowly in the solid state by superplastic forming. For the latter process, the pieces being joined (the head portion/screw portion and the interlock portion) are not melted, even locally, during the joining process. There is no limitation on the thickness of the joint. The strength of the joint follows from the diffusional incorporation of metallic atoms from the surfaces of the pieces being joined into the liquid or undercooled liquid interlock portion. The joint is therefore typically stronger than the pieces being joined, so that tests of joined pieces usually result in failure in the pieces being joined at locations remote from the joint, rather than at the joint itself. The approach of the embodiments has almost no dependence upon operator skill, nor does it require that the surfaces of the articles being joined have a particular surface finish. It is therefore highly reproducible and well suited for large-scale commercial operations.

In accordance with the embodiments, there are furnished a head portion with or without a screw portion (a head/screw portion) to be joined having a first composition and a interlock portion to be joined having a second composition, wherein the first and second compositions may be the same or different. A joining processing sequence is selected, including a joining temperature, joining time, joining pressure, and cooling rate. In conjunction with this selection, the head/screw portion and the interlock portion are selected and furnished. The interlock portion has an initial amorphous composition within a joinability compositional range and is preferably formed of at least three elements. The joinability compositional range is characterized by the retention of the amorphous state after the joining processing sequence is performed with the interlock portion in contact with the head/screw portion. The method further includes placing the interlock portion adjacent to the head/screw portion, and processing the region of the interlock portion and the adjacent head/screw portion with the joining processing sequence.

In one embodiment, the interlock portion is selected to have an initial composition that is retained in the amorphous state after the joining processing sequence is complete. There is also an associated composition of the interlock portion that is related to the initial composition as the result of the surface-contact diffusion into the initial composition of further alloying elements from the head/screw portion during the joining processing sequence. The associated compositions are also retained in the amorphous state at the conclusion of the joining processing sequence.

Thus, the final joined structure includes the head/screw portion and the amorphous interlock portion. The interlock portion could be fully amorphous, and the head/screw portion retains its original structure. The amorphous metal aids in achieving a good bond by flowing in a viscous manner above its glass transition temperature during bonding and cooling, to fill any voids that would otherwise be present at the interface and to negate residual stresses formed due to the difference in thermal expansion coefficients of the amorphous metal and the head/screw portion. After bonding, the amorphous metal has a high strength. The interdiffusional bond between the screw/head portion and the amorphous alloy interlock portion and the strength of the interlock portion result in a strong joint, regardless of the thickness of the joint. That is, the joint does not rely for its strength on a triaxial stress state as in the case of brazed joints, although such a triaxial stress state may be present for the joint of the embodiments if the joint is thin compared to its length and depth.

Other embodiments are directed to joining a bulk-solidifying amorphous alloy material interlock portion to a non-amorphous material head/screw portion including by casting to form a cast mechanical joint between the bulk solidifying amorphous alloy interlock portion and the non-amorphous material head/screw portion. For example, in one embodiment, the joint is formed by controlling the melting point of the non-amorphous and bulk-solidifying amorphous alloys (amorphous metals). In one such embodiment, where the non-amorphous metal has a higher melting point than the melting point of the amorphous metal, the non-amorphous metal is properly shaped and the bulk-solidifying amorphous alloy is melted and cast as the interlock portion against the piece of preformed non-amorphous metal head/screw portion by a technique such as injection or die casting. In another such embodiment, where the non-amorphous metal has a lower melting point than the melting point of the amorphous metal, the non-amorphous material may be joined to the bulk-solidifying amorphous alloy interlock portion by melting the non-amorphous alloy and casting it into the head/screw portion, as by injection or die casting, against a piece of the properly shaped and configured bulk-solidifying amorphous alloy interface portion which remains solid.

In another embodiment, the joint is formed by controlling the cooling rate of the non-amorphous and amorphous metals. In one such embodiment, a non-amorphous metal head/screw portion is cast against a piece of pre-formed bulk-solidifying amorphous alloy interlock portion, and cooled from the casting temperature of the non-amorphous alloy down to below the glass transition temperature of bulk-solidifying amorphous alloy at rates at least about the critical cooling rate of bulk solidifying amorphous alloy. In either of the above embodiments, a system, such as a heat sink may be provided to ensure that the correct sequence of the time-temperature profile during processing.

Figure 5:
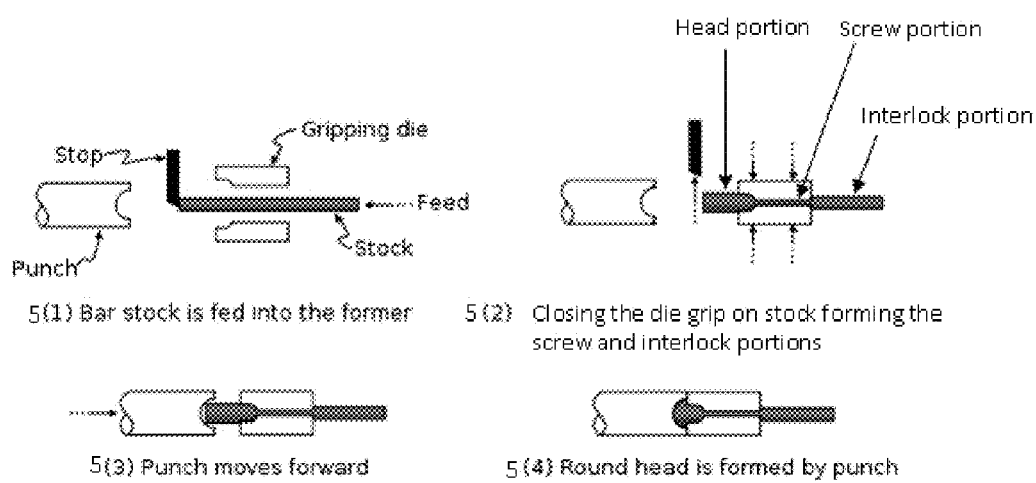
FIGS. 5(1) to 5(4) provide a schematic of a thermoplastic forming process ("hot forming process") for manufacturing an exemplary fastener having a head portion, a screw portion and an interlock portion.

For the type (b) fastener, the head portion as well as the bulk solidifying amorphous alloy interlock portion could be made as a unitary body using method shown in FIGS. 5(1) to 5(4) for making a bolt/screw. The fastener could be made from wire of a bulk solidifying amorphous alloy containing a metal alloy, which is supplied in large coils, or round bar stock for larger screws. The wire or rod (blank or bar stock) is heated to above the glass transition temperature Tx and below Tm, more preferably below Tx, of the metal alloy, and cut to the proper length for the type of screw being made and fed into the screw former as shown in FIG. 5(1); this workpiece is known as a blank or bar stock. The die grip of the screw former is closed on the heated bar stock to form the screw portion and the interlock portion of the screw portion as shown in FIG. 5(2). Subsequently, the head former (punch) moves forward as shown in FIG. 5(3) and the head portion is molded into the shape of the screw head as shown in FIG. 5(4). The shape of the die in the machine dictates what features are pressed into the screw head. As the bulk amorphous solidifying alloy can be thermoformed to form the thread portion at the same time as forming the head and interlock portions, the thread portion is not required to be produced via thread rolling, as done for making a threaded fastener from a conventional metal.

Subsequent to forming the complete screw/bolt of the bulk solidifying amorphous alloy, the head portion of the screw/bolt could be crystallized, if desired, by localized heating of the head, for example by laser controlled induction heating, and slow cooling the head portion while maintaining the interlock portion below Tg during this crystallization process so that the interlock portion remains as a bulk solidifying amorphous alloy.

Tamper Resistant Fastening

Figure 6:
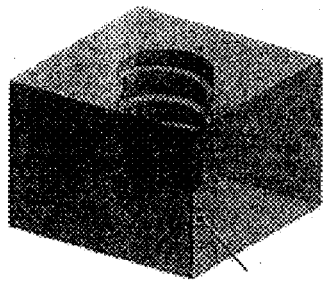
FIGS. 6(1) to 6(4) provide a schematic of a thermoplastic forming process for fastening an exemplary fastener having a head portion, a screw portion and an interlock portion into a substrate.
Figure 6:
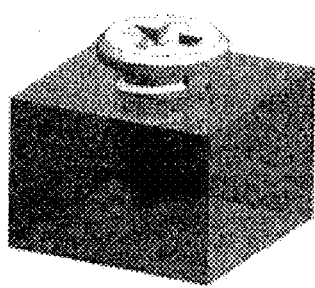
Figure 6:
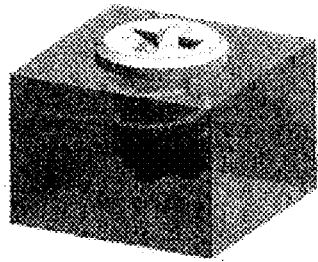
Figure 6:
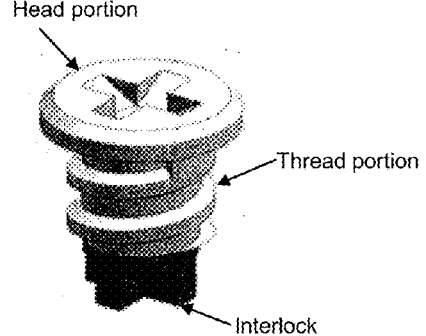

Tamper resistant fastening using a fastener of the embodiments herein could be carried out, for example, in accordance with FIGS. 6(1) to 6(4). FIG. 6(1) shows a substrate into which the fastener is to be attached. The substrate has a threaded portion and an interlock forming feature at the bottom. The fastener with a bulk solidifying amorphous alloy interlock portion is obtained and the interlock portion is heated to a thermoplastic forming temperature above the Tg of the bulk solidifying amorphous alloy of the interlock portion, and while the interlock portion is at the thermoplastic forming temperature, the fastener is inserted into the substrate as shown in FIG. 6(2) and the fastener is fastened to the substrate, for example by screwing the fastener, as shown in FIG. 6(3) to transform the shape of the interlock portion of the fastener into an interlock as shown at the bottom of the fastener in FIG. 6(4). Alternatively or in addition, the substrate can be heated to a temperature above the Tg of the bulk solidifying amorphous alloy of the interlock portion, and the fastener is inserted into the substrate as shown in FIG. 6(2) and the fastener is fastened to the substrate, for example by screwing the fastener, as shown in FIG. 6(3) to transform the shape of the interlock portion of the fastener into an interlock as shown at the bottom of the fastener in FIG. 6(4). While FIG. 6(4) shows an interlock that is cross shaped, the interlock could have any shape that would prevent the fastener from being removed (unscrewed or pulled out) without destroying the fastener. Also, heating of the fastener, the interlock portion and/or the substrate could be done by any method of heating, including IR heating, electric heating, induction heating, conductive heating or convective heating.

In the embodiments herein, once the interlock is formed by the thermoplastic forming process, the interlock could either be allowed to remain amorphous or crystallized into a crystalline state. For example, if the fastening process is a thermoplastic forming process carried out in the superplastic region of the metal alloy of the bulk solidifying amorphous alloy interlock portion, then by definition the interlock in FIG. 6(4) is amorphous before and after the process. However, there could be situations where one would purposely want the interlock to be crystalline to prevent further thermoplastic forming of the interlock and to "permanently" freeze the interlock in the substrate as the possible ways to remove a crystalline interlock would be by melting the interlock, which in turn would likely destroy the component to with the fastener would be attached, or breaking off the head/screw portion from the interlock. However, either ways of removing the interlock would reveal tampering.

Uses of Tamper Resistant Fastener

Unlike soldering which is kind of a melt process, the tamper resistant amorphous alloy fastening using the embodiments of the fasteners herein could be a thermoplastic-forming process, wherein one would require a little bit more force to mate fastener with the substrate and form interlock than attaching a conventional fastener without the interlock, but the force would not be nearly as extreme as that needed for a weld or a brace, for example. Furthermore, thermoplastic-forming of amorphous alloys could done without excessive heating, for example, at temperatures in the range of 300-500 degree C.—typically in the range of 400-500 degree C. for Zr-based amorphous alloys and substantially lower for precious metal-based amorphous alloys. Also, amorphous alloys soften and can undergo strains of hundreds of percent, limited only by the applied strain rate. In addition, amorphous alloys will exhibit their full strength and hardness immediately after the thermoplastic-forming process, and typical values are comparable to high strength steels or titanium alloys. Thus, this fastening process using the fasteners of the embodiments herein is capable of generating high localized strains at relatively low temperatures while producing an extremely high strength junction between the fastener and the substrate into which the fastener is fastened. Furthermore, this junction will be difficult to separate without causing substantial damage to the joined parts, i.e., the fastener and substrate.

Also, one could locally heat the interlock portion very precisely, for example by induction heating or laser heating prior to the thermoplastic forming process of the interlock portion. One could join an amorphous alloy to dissimilar materials. One could reheat the amorphous alloy in the vicinity of the junction to render it crystalline and brittle.

Tamper-resistant amorphous alloy fastening could be used for tamper-resistant electronic devices such as a computer and cell phone, for example. Tamper resistance amorphous alloy fastening could be used for set-top boxes and other devices that use digital rights management.

Tamper resistance amorphous alloy fastening for nuclear reactors that are intended to be sold to countries that otherwise do not possess nuclear weapons need to be made tamper-resistant to prevent nuclear proliferation. For example, the tamper resistance amorphous alloy fastening technique could be combined with detection and alarms in place that sound if attempts at entry are detected.

In one embodiment of the 'notched-screw' fastener, the notch could be compressed during insertion, but put in shear/tension when being unscrewed. In another embodiment, the interlock portion could be made by insert casting.

What is claimed:

1. A fastener comprising a head portion and an interlock portion comprising a bulk solidifying amorphous alloy comprising a metal alloy, wherein the fastener once fastened to a substrate is permanently retained within the substrate by the interlock portion, the bulk solidifying amorphous alloy of the interlock portion is thermoformable, and the interlock portion has different shapes before and after being fastened to the substrate.

2. The fastener of claim 1, further comprising a screw portion.

3. The fastener of claim 2, wherein the head portion and/or the screw portion and the interlock portion have substantially the same composition and substantially the same amorphicity.

4. The fastener of claim 2, wherein the head portion and/or the screw portion and the interlock portion have substantially the same composition and different amorphicity.

5. The fastener of claim 2, wherein the head portion and/or the screw portion and the interlock portion have different composition and different amorphicity.

6. The fastener of claim 1, wherein the metal alloy is described by the following molecular formula: $(Zr, Ti)_a(Ni, Cu, Fe)_b(Be, Al, Si, B)_c$, wherein "a" is in the range of from 30 to 75, "b" is in the range of from 5 to 60, and "c" is in the range of from 0 to 50 in atomic percentages.

7. The fastener of claim 1, wherein the metal alloy is described by the following molecular formula: $(Zr, Ti)_a(Ni, Cu)_b(Be)_c$, wherein "a" is in the range of from 40 to 75, "b" is in the range of from 5 to 50, and "c" is in the range of from 5 to 50 in atomic percentages.

8. The fastener of claim 1, wherein the fastener comprises a bolt, a captive fastener, a nail, a pin, a rivet, a self-clinching, snap, a threaded fastener, a wedge anchor, a zipper or combinations thereof.

9. The fastener of claim 8, wherein the threaded fastener comprises a captive threaded fastener, a nut, a screw, a screw anchor, a stud, a threaded insert, a threaded rod or combinations thereof.

10. The fastener of claim 1, wherein the fastener comprises a threaded rotational fastener and the head portion comprises a non-amorphous head portion.

11. A fastener comprising an interlock portion comprising a bulk solidifying amorphous alloy comprising a metal alloy, wherein the fastener once fastened to a substrate is permanently retained within the substrate by the interlock portion, the bulk solidifying amorphous alloy of the interlock portion is thermoformable, and the interlock portion has different shapes before and after being fastened to the substrate.

12. The fastener of claim 11, further comprising a head portion.

13. The fastener of claim 11, further comprising a screw portion.

14. The fastener of claim 11, wherein the fastener comprises a bolt, a captive fastener, a nail, a pin, a rivet, a self-clinching, snap, a threaded fastener, a wedge anchor, a zipper or combinations thereof.

15. The fastener of claim 14, wherein the threaded fastener comprises a captive threaded fastener, a nut, a screw, a screw anchor, a stud, a threaded insert, a threaded rod or combinations thereof.

16. The fastener of claim 11, wherein the fastener comprises a threaded rotational fastener and the head portion comprises a non-amorphous head portion.

17. The fastener of claim 11, further comprising a head portion and a screw portion.

18. The fastener of claim 17, wherein the head portion and/or the screw portion and the interlock portion have substantially the same composition and substantially the same amorphicity.

19. The fastener of claim 17, wherein the head portion and/or the screw portion and the interlock portion have substantially the same composition and different amorphicity.

20. The fastener of claim 17, wherein the head portion and/or the screw portion and the interlock portion have different composition and different amorphicity.

* * * * *